US010093289B2

(12) United States Patent
Lee

(10) Patent No.: US 10,093,289 B2
(45) Date of Patent: Oct. 9, 2018

(54) AUTONOMOUS EMERGENCY BRAKING SYSTEM AND METHOD OF CONTROLLING THE SAME

(71) Applicant: MANDO CORPORATION, Pyeongtaek-si, Gyeonggi-do (KR)

(72) Inventor: Hyung-Jik Lee, Seongnam-si (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 28 days.

(21) Appl. No.: 15/070,977

(22) Filed: Mar. 15, 2016

(65) Prior Publication Data
US 2016/0272172 A1 Sep. 22, 2016

(30) Foreign Application Priority Data

Mar. 16, 2015 (KR) .................. 10-2015-0035716

(51) Int. Cl.
B60T 7/12 (2006.01)
B60T 7/22 (2006.01)
(Continued)

(52) U.S. Cl.
CPC .................... B60T 7/22 (2013.01);
B60T 8/17 (2013.01); B60T 8/171 (2013.01);
B60T 7/12 (2013.01);
(Continued)

(58) Field of Classification Search
CPC ..... B60T 7/22; B60T 7/12; B60T 8/17; B60T 8/171; B60T 2201/03; B60T 2201/022;
(Continued)

(56) References Cited

U.S. PATENT DOCUMENTS

2007/0109110 A1* 5/2007 Ohmura .............. B60R 21/0132
340/435
2011/0205042 A1* 8/2011 Takemura .............. G08G 1/166
340/435
(Continued)

FOREIGN PATENT DOCUMENTS

CN 102792349 A 11/2012
CN 103359112 A 10/2013
(Continued)

OTHER PUBLICATIONS

German Office Action dated May 11, 2017 issued in German Patent Application No. 1020160003089.5.
(Continued)

Primary Examiner — Nadeem Odeh
(74) Attorney, Agent, or Firm — McDermott Will & Emery LLP

(57) ABSTRACT

An autonomous emergency braking system includes a vehicle speed detector, a pedestrian position detector, a pedestrian information storage portion and an electronic control unit which receives the vehicle speed and information of the position of the pedestrian detected by the pedestrian position detector, calculates a time to collision (TTC), predicts a relative position of the pedestrian compared with the vehicle at a point in time after the calculated TTC passes by tracking a moving trajectory of the pedestrian from a time series change in the position of the pedestrian stored in the pedestrian information storage portion, and performs autonomous emergency braking control depending on the predicted relative position of the pedestrian.

7 Claims, 7 Drawing Sheets

(51) Int. Cl.
*B60T 8/17* (2006.01)
*B60T 8/171* (2006.01)

(52) U.S. Cl.
CPC ..... *B60T 2201/022* (2013.01); *B60T 2201/03* (2013.01)

(58) Field of Classification Search
CPC ........................ B60T 2201/024; B60W 30/08; B60W 30/095
USPC ..................................................... 701/70, 301
See application file for complete search history.

(56) References Cited

U.S. PATENT DOCUMENTS

| | | | | |
|---|---|---|---|---|
| 2014/0324286 A1* | 10/2014 | Tsuchida | .......... | G08G 1/096758 701/36 |
| 2015/0183431 A1* | 7/2015 | Nanami | ................ | B60W 40/04 701/301 |
| 2015/0232073 A1* | 8/2015 | Fujishiro | ................... | B60T 7/22 701/70 |

FOREIGN PATENT DOCUMENTS

| | | |
|---|---|---|
| CN | 103863321 A | 6/2014 |
| CN | 104077926 A | 10/2014 |
| CN | 104149728 A | 11/2014 |
| DE | 102004037704 A1 | 2/2006 |
| DE | 102004056027 A1 | 5/2006 |
| DE | 602004002081 T2 | 3/2007 |
| DE | 102012008968 A1 | 11/2012 |
| DE | 102011104477 A1 | 12/2012 |
| DE | 102012111846 A1 | 6/2013 |
| JP | 2012008815 A | 1/2012 |
| KR | 10-2013-0112218 A | 10/2013 |

OTHER PUBLICATIONS

Chinese Office Action dated Mar. 30, 2018 issued in Chinese Patent Application No. 201610149695.9.

* cited by examiner

AUTONOMOUS EMERGENCY BRAKING SYSTEM AND METHOD OF CONTROLLING THE SAME

CROSS-REFERENCE TO RELATED APPLICATION

This application claims the benefit of Korean Patent Application No. 10-2015-0035716, filed on Mar. 16, 2015 in the Korean Intellectual Property Office, the disclosure of which is incorporated herein by reference.

BACKGROUND

1. Field

Embodiments of the present invention relate to an autonomous emergency braking system, and more particularly, to an autonomous emergency braking system which autonomously determines a risk of colliding with an object ahead and automatically controls a brake and a method of controlling the same.

2. Description of the Related Art

Generally, braking systems, regardless of components thereof, start braking of a vehicle after a driver presses a brake pedal. Accordingly, in the case of drivers with a limit in a response time, it is difficult to quickly brake a vehicle.

Autonomous emergency braking systems are systems in which a vehicle autonomously senses a risk in advance using an object sensor such as a radar or a camera attached to a front of the vehicle and braking is automatically controlled to prevent a collision.
Recent autonomous emergency braking systems autonomously perform an emergency brake when a pedestrian is detected regardless of braking of a driver based on a relative speed and distance to the pedestrian to prevent a collision with the pedestrian.

Existing autonomous emergency braking systems set a warning area and a braking area in front of a width of a vehicle and give a warning and perform emergency braking when a pedestrian is located in the corresponding area.

However, conventionally, warnings are given and emergency braking is performed based only on current positions of pedestrians. Accordingly, since warnings are given and emergency braking is performed even when pedestrians latterly move and collisions do not occur, pedestrians may be unnecessarily startled or occasional excessive braking may be performed even when avoidance can be easily performed by steering or pedestrians can easily escape therefrom.

PRIOR ART DOCUMENT

Patent Document

Korean Patent Publication No. 2013-0112218 (Oct. 14, 2013)

SUMMARY

Therefore, it is an aspect of the present invention to provide an autonomous emergency braking system capable of predicting relative positions of a vehicle and a pedestrian according to a lateral movement of the pedestrian to give an appropriate warning and to control braking, and a method of controlling the same.

Additional aspects of the invention will be set forth in part in the description which follows and, in part, will be obvious from the description, or may be learned by practice of the invention.

In accordance with one aspect of the present invention, an autonomous emergency braking system which performs at least one of warning of a risk of collision and emergency braking includes a vehicle speed detector which detects a vehicle speed of a vehicle, a pedestrian position detector which detects a position of a pedestrian, a pedestrian information storage portion which stores the position of the pedestrian detected by the pedestrian position detector in time series, and an electronic control unit which, when the position of the pedestrian detected by the pedestrian position detector is located in a warning area or a braking area in front of the vehicle, receives the vehicle speed detected by the vehicle speed detector and information of the position of the pedestrian detected by the pedestrian position detector, calculates a time to collision (TTC) according to a relative distance between the vehicle and the pedestrian and relative speeds thereof, predicts a relative position of the pedestrian compared with the vehicle at a point in time after the calculated TTC passes by tracking a moving trajectory of the pedestrian from a time series change in the position of the pedestrian, stored in the pedestrian information storage portion, and performs autonomous emergency braking control depending on the predicted relative position of the pedestrian.

The electronic control unit may estimate a future position of the pedestrian and a future position of the vehicle at the point in time the calculated TTC passes, respectively, may compare the estimated future position of the pedestrian and the estimated future position of the vehicle, and may predict a relative position of the pedestrian compared with the vehicle according to the relative distance between the vehicle and the pedestrian based on a width of the vehicle in a lateral direction of the vehicle.

The electronic control unit may give a warning when a current position of the pedestrian is in the warning area and the predicted relative distance of the pedestrian is closer than a preset distance, and may postpone the warning when the predicted relative distance of the pedestrian is farther than the preset distance.

The electronic control unit may perform a braking operation when a current position of the pedestrian is in the braking area and the predicted relative distance of the pedestrian is closer than a preset distance, and may postpone the braking operation when the predicted relative distance of the pedestrian is farther than the preset distance.

The autonomous emergency braking system may include a braking level generator which generates a braking level for braking the vehicle. Here, the electronic control unit may cause the braking level generator to generate a necessary braking level differently depending on the predicted relative position of the pedestrian when a current position of the pedestrian is in the braking area.

The electronic control unit may gradually reduce the necessary braking level generated by the braking level generation portion as the predicted relative position of the pedestrian becomes farther from the preset distance.

In accordance with another aspect of the present invention, a method of controlling an autonomous emergency braking system which performs at least one of warning of a risk of collision and emergency braking includes detecting a position of a pedestrian, calculating, when the detected position of the pedestrian is located in a warning area or a braking area in front of a vehicle, a TTC according to a relative distance between the vehicle and the pedestrian and relative speeds thereof, predicting a relative position of the pedestrian compared with the vehicle at a point in time after the calculated TTC passes by tracking a moving trajectory of the pedestrian from a time series change in the position of the pedestrian, and performing or postponing autonomous emergency braking control depending on the predicted relative position of the pedestrian.

When a current position of the pedestrian is in the warning area or the braking area and the predicted relative distance of the pedestrian is within a preset distance from the vehicle in a lateral direction of the vehicle, a corresponding autonomous emergency braking control may be performed, and when otherwise, the corresponding autonomous emergency braking control may be postponed.

When a current position of the pedestrian is in the braking area and the predicted relative distance of the pedestrian is within a preset distance from the vehicle in a lateral direction of the vehicle, a braking operation may be performed, and otherwise, the braking operation may be postponed. Also, while the braking operation is performed, a necessary braking level generated to brake the vehicle may be gradually reduced as the predicted relative position of the pedestrian becomes farther from the vehicle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
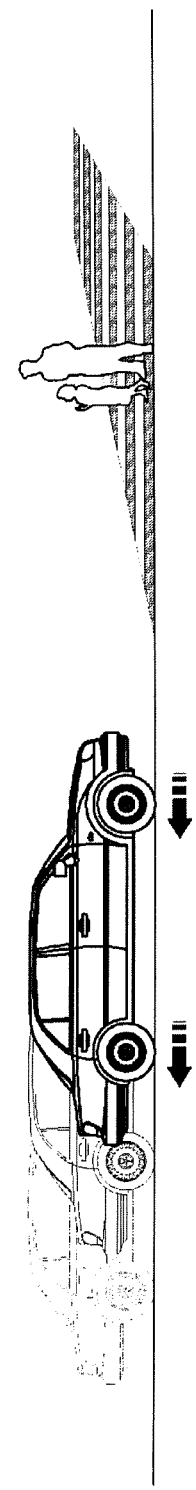
FIG. 1 is a configuration diagram illustrating control of autonomous emergency braking in a warning area and a braking area of an autonomous emergency braking system in accordance with one embodiment of the present invention.

Hereinafter, exemplary embodiments of the present invention will be described in detail with reference to the attached drawings. The embodiments which will be described below are provided as an example to allow one of ordinary skill in the art to fully understand the concept of the present invention. The present invention is not limited to the embodiments described below and may be embodied in other forms. To clearly describe the present invention, a part irrelevant to the description will be omitted in the drawings. Throughout the drawings, a width, length, and thickness of a component may be exaggerated for convenience of description. Like reference numerals designate like elements throughout.

FIG. 1 is a configuration diagram illustrating control of autonomous emergency braking in a warning area and a braking area of an autonomous emergency braking system in accordance with one embodiment of the present invention.

Referring to FIG. 1, the autonomous emergency braking system, unlike a front-end collision warning system which gives a warning to a driver, actively intervenes in a collision-expected situation and performs a braking operation to prevent an accident or to minimize a damage thereof.

When a pedestrian is detected, the autonomous emergency braking system autonomously performs emergency braking regardless of a braking of a driver based on a relative speed of the pedestrian and a relative distance therebetween to prevent a collision with the pedestrian.

When the detected pedestrian is located in a warning area, the autonomous emergency braking system alerts the driver through a warning sound. Also, advance preparations such as increasing a pressure of a braking system and reducing a distance between a brake pad and a disc are performed to provide maximal braking performance even when the driver presses a brake pedal late. When the driver does not presses the brake pedal and the detected pedestrian is located in the braking area, a brake is automatically operated to perform emergency braking.

Figure 2:
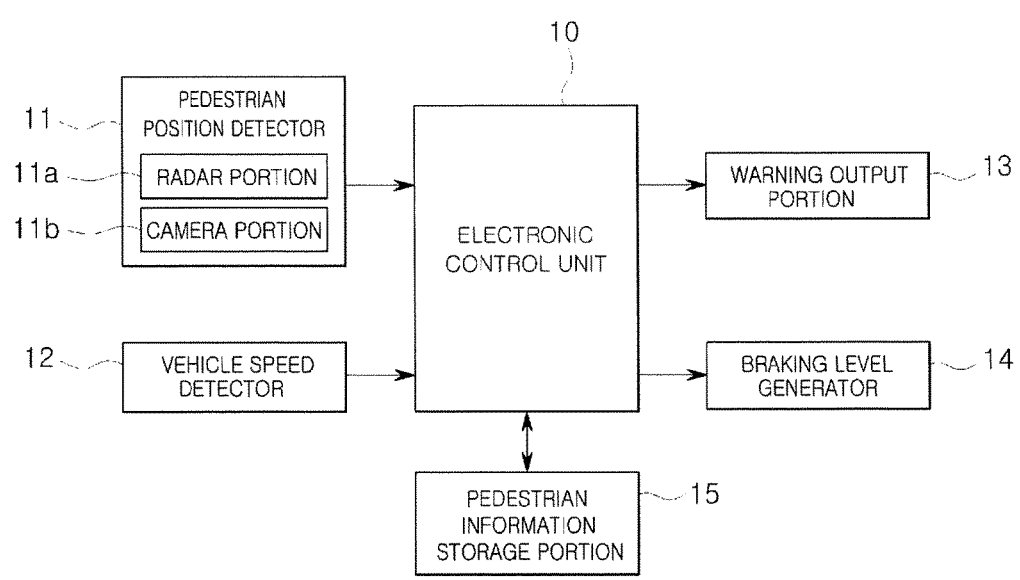
FIG. 2 is a control block diagram of the autonomous emergency braking system in accordance with one embodiment of the present invention.

FIG. 2 is a control block diagram of the autonomous emergency braking system in accordance with one embodiment of the present invention.

Referring to FIG. 2, the autonomous emergency braking system includes an electronic control unit 10 which performs overall control.

A pedestrian position detector 11 and a vehicle speed detector 12 are electrically connected to an input side of the electronic control unit 10.

A warning output portion 13 and a braking level generator 14 are electrically connected to an output side of the electronic control unit 10.

A pedestrian information storage portion 15 is electrically connected to an input/output side of the electronic control unit 10.

The pedestrian position detector 11 detects a position of a pedestrian. The pedestrian position detector 11 may include a radar portion 11a and a camera portion 11b. The pedestrian position detector 11 may recognize and output pedestrian position information from radar information detected through the radar portion 11a and image information detected through the camera portion 11b.

The radar portion 11a is for detecting an object in front of the vehicle and detects relative speeds of the vehicle and the pedestrian and a relative distance therebetween. The radar portion 11a is a wireless monitoring device which emits electromagnetic waves to a degree of microwaves (ultrahigh frequency with a wavelength from about 10 cm to 100 cm) to an object and receives electromagnetic waves reflected from the object to detect a distance from the object, a direction, an altitude, etc. of the object and is a radar device which detects a pedestrian in front of the vehicle. The radar portion 11a may be replaced by light detection and ranging (LiDAR). The LiDAR is a type of a radar device using a laser beam.

The camera portion 11b captures an image of a view in front of the vehicle to detect a pedestrian. The camera portion 11b may include an image sensor which converts an input optical signal into an electrical signal and an image signal processor which converts the electrical signal input from the image sensor into digital image data. The image sensor may include a charge-coupled device (CCD) type sensor or a complementary metal-oxide-semiconductor (CMOS) type sensor.

The vehicle speed detector 12 detects a speed of the vehicle. The vehicle speed detector 12 may include a wheel speed detector which detects a wheel speed of each wheel. The wheel speed detector may include an FL wheel speed sensor installed at a front-left wheel of the vehicle to detect a speed of the front-left wheel, an FR wheel speed sensor installed at a front-right wheel of the vehicle to detect a speed of the front-right wheel, an RL wheel speed sensor installed at a rear-left wheel of the vehicle to detect a speed of the rear-left wheel, and an RR wheel speed sensor installed at a rear-right wheel of the vehicle to detect a speed of the rear-right wheel. The vehicle speed detector 12 transmits the speed of the vehicle to the electronic control unit 10.

The warning output portion 13 warns of a risk of colliding with a pedestrian. The warning output portion 13 is formed as a visual component such as a warning lamp or an auditory component such as a buzzer, is installed in an appropriate position inside the vehicle, and warns of the risk of colliding with the pedestrian by operating the warning lamp or the buzzer according to a control signal of the electronic control unit 10. The warning output portion 13 may employ a speaker as the auditory component, which may be embodied using a speaker of a car audio system provided in the vehicle or using an additional speaker in an appropriate position inside the vehicle. The warning output portion 13 may include a human machine interface (HMI) of the vehicle.

The braking level generator 14 generates a braking level for braking the vehicle. The braking level generator 14 may generate a hydraulic braking level using a motor operated hydraulic booster.

The pedestrian information storage portion 15 stores the pedestrian position information detected by the pedestrian position detector 11 in a time series according to a control signal of the electronic control unit 10.

The electronic control unit 10 performs autonomous emergency braking control which performs at least one of a collision risk warning and emergency braking.

The electronic control unit 10 receives the pedestrian position information detected through the pedestrian position detector 11 and vehicle speed information detected through the vehicle speed detector 12. The electronic control unit 10 calculates a time to collision (TTC) according to the relative distance between the vehicle and the pedestrian and the relative speeds thereof using the input pedestrian position information and vehicle speed information. The electronic control unit 10 estimates a relative pedestrian position compared with the vehicle at a point in time after the calculated TTC passes by tracking a moving trajectory of the pedestrian from a time series change of the pedestrian position stored in the pedestrian information storage portion 15. The electronic control unit 10 performs autonomous emergency braking depending on the predicted relative pedestrian position.

When a pedestrian position is present in the warning area, the electronic control unit 10 may generate a necessary braking level differently depending on whether the relative pedestrian position compared with the vehicle at the point in time after the TTC passes is within or out of a preset distance based on a width of the vehicle in a lateral direction of the vehicle. That is, as a result of estimation, as the relative pedestrian position becomes farther from the vehicle in the lateral direction of the vehicle, the necessary braking level is linearly reduced to perform a slower brake. As the relative pedestrian position is closer than the vehicle in the lateral direction of the vehicle, the necessary braking level is increased to perform emergency braking.

Figure 3:
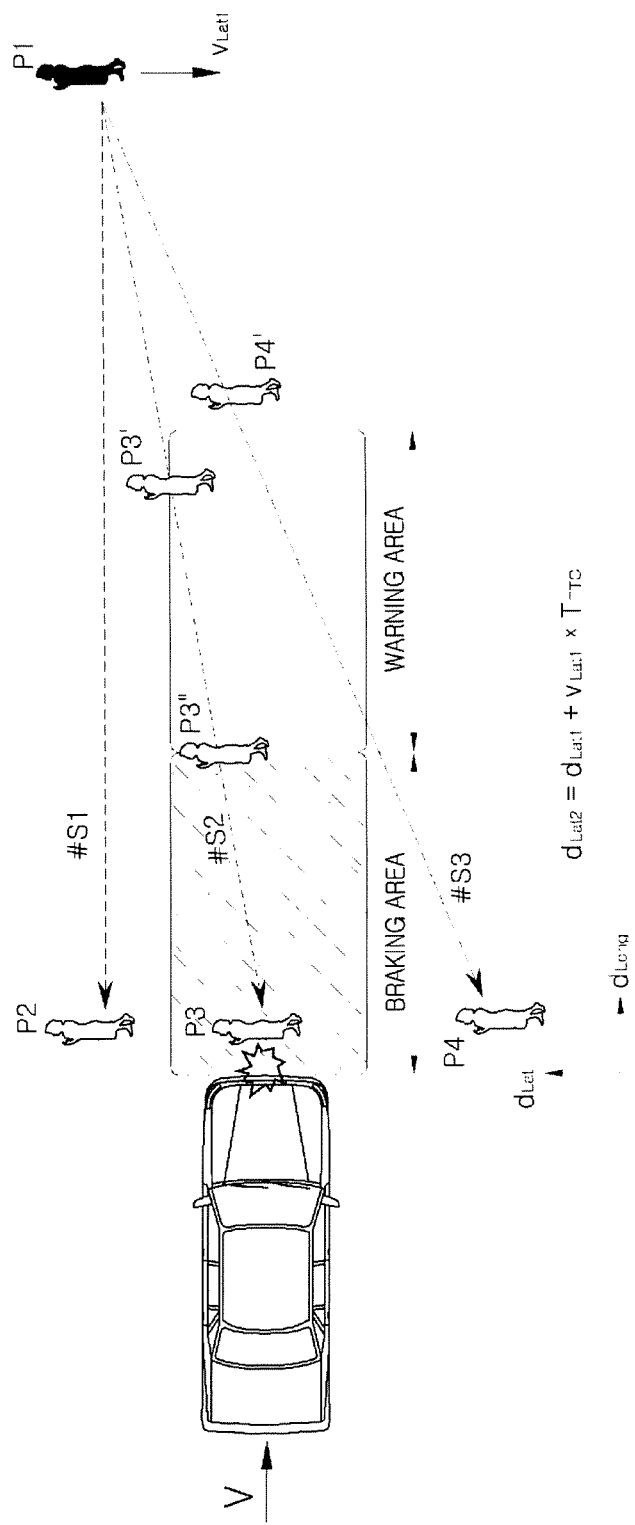
FIG. 3 is a view illustrating control of autonomous emergency braking for each relative pedestrian position predicted by the autonomous emergency braking system in accordance with one embodiment of the present invention.

FIG. 3 is a view illustrating control of autonomous emergency braking for each relative pedestrian position predicted by the autonomous emergency braking system in accordance with one embodiment of the present invention.

Referring to FIG. 3, in a general case, the autonomous emergency braking system determines the warning area and the braking area in front of the vehicle in the lateral direction and gives a warning and performs braking when a pedestrian is located in an area corresponding thereto.

P1 is a present position of a pedestrian, and P2, P3, and P4 are vehicle-pedestrian-collision-predicted positions, that is, relative pedestrian positions at a point in time after a TTC passes, calculated according to the relative distance between the vehicle and the pedestrian and the relative speeds thereof.

Since the pedestrian is actively moving in a lateral direction unlike the vehicle, a technology of estimating a collision is necessary.

When a speed of the vehicle is referred to as V and a distance between the vehicle and the pedestrian is referred to as d_Long, a TTC between the vehicle and the pedestrian may be obtained through the following Equation 1.

$$TTC = d\_Long/V \quad \text{Equation (1)}$$

A predicted pedestrian position in a lateral direction d_Lat2 may be obtained through the following Equation 2 according to a relationship among a current pedestrian position in a lateral direction d_Lat1, a speed in the lateral direction v_Lat1, and TTC.

$$d\_Lat2 = d\_Lat1 + v\_Lat1 \times TTC \quad \text{Equation (2)}$$

Accordingly, it is possible to obtain how far relative pedestrian positions P2, P3, and P4 predicted at respective ambulatory paths are spaced from the vehicle in the lateral direction of the vehicle based on the width of the vehicle.

When the pedestrian moves along a #S1 ambulatory path from P1 to P2, since the pedestrian does not pass through the warning area and the braking area while moving from P1 to P2, the electronic control unit 10 does not warn or perform an emergency braking operation.

Also, when the pedestrian moves from P1 to P3' within the warning area while moving along a #S2 ambulatory path from P1 to P3, the electronic control unit 10 warns of a risk of colliding with the pedestrian. When the pedestrian moves from P3' to P3", the electronic control unit 10 automatically performs an emergency braking operation to stop the vehicle before the pedestrian arrives at P3.

Figure 4:
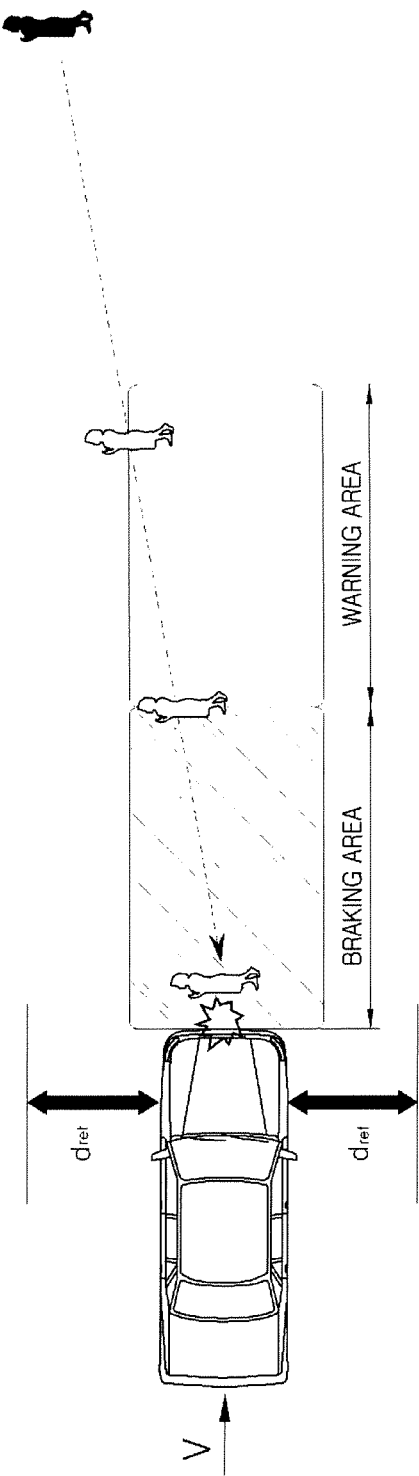
FIG. 4 is a view illustrating control of autonomous emergency braking in a case in which the relative pedestrian position predicted by the autonomous emergency braking system in accordance with one embodiment of the present invention is within a preset distance from the vehicle in a lateral direction.

FIG. 4 is a view illustrating control of autonomous emergency braking in a case in which the relative pedestrian position predicted by the autonomous emergency braking system in accordance with one embodiment of the present invention is within a preset distance from the vehicle in a lateral direction.

Referring to FIG. 4, when a future position of the vehicle and a future position of a pedestrian at a point in time after a TTC passes, calculated according to a relative distance between the vehicle and the pedestrian and relative speeds thereof, are compared and a relative pedestrian position is within a preset distance dref from the vehicle, the electronic control unit 10 gives a warning when the pedestrian is located in the warning area and performs autonomous emergency braking when the pedestrian is located in the braking area.

Referring back to FIG. 3, when the pedestrian moves along a #S3 ambulatory path from P1 to P4, although the pedestrian moves from P1 to P4' in the warning area, the electronic control unit 10 may not give a warning. This is because P4 which is a predicted relative pedestrian position at a point in time after the TTC passes is far from the vehicle in the lateral direction and thus a risk of collision is low and thus the driver may fully avoid a collision with the pedestrian.

Figure 5:
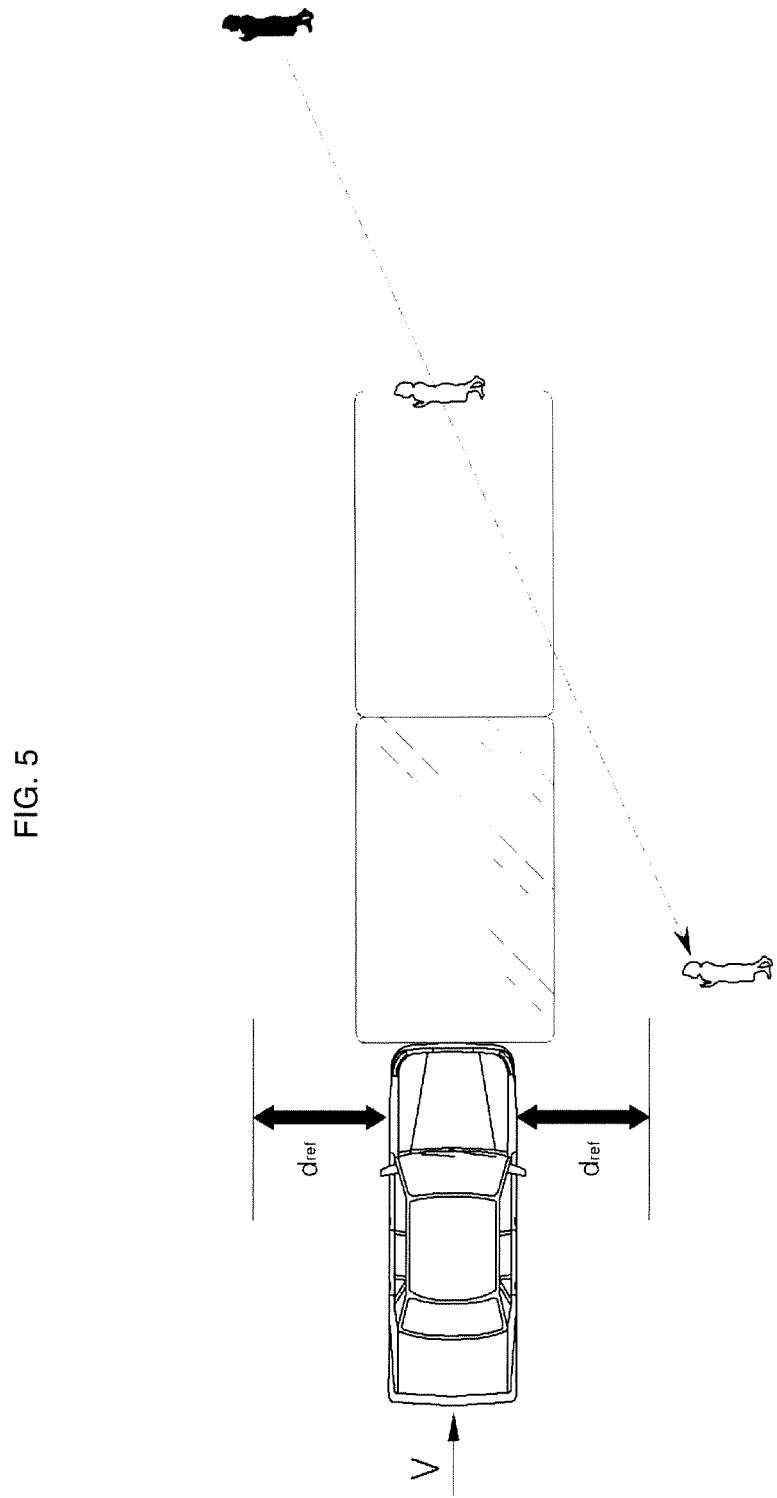
FIG. 5 is a view illustrating control of autonomous emergency braking in a case in which the relative pedestrian position predicted by the autonomous emergency braking system in accordance with one embodiment of the present invention is out of the preset distance from the vehicle in the lateral direction.

FIG. 5 is a view illustrating control of autonomous emergency braking in a case in which the relative pedestrian position predicted by the autonomous emergency braking system in accordance with one embodiment of the present invention is out of the preset distance from the vehicle in the lateral direction.

Referring to FIG. 5, when the future position of the vehicle and the future position of the pedestrian at the point in time after the TTC passes, calculated according to the relative distance between the vehicle and the pedestrian and the relative speeds thereof, are compared and the relative pedestrian position is farther than the preset distance dref from the vehicle, the electronic control unit 10 does not give a warning and defers the warning and autonomous emergency braking although the pedestrian is located in the warning area.

Figure 6:
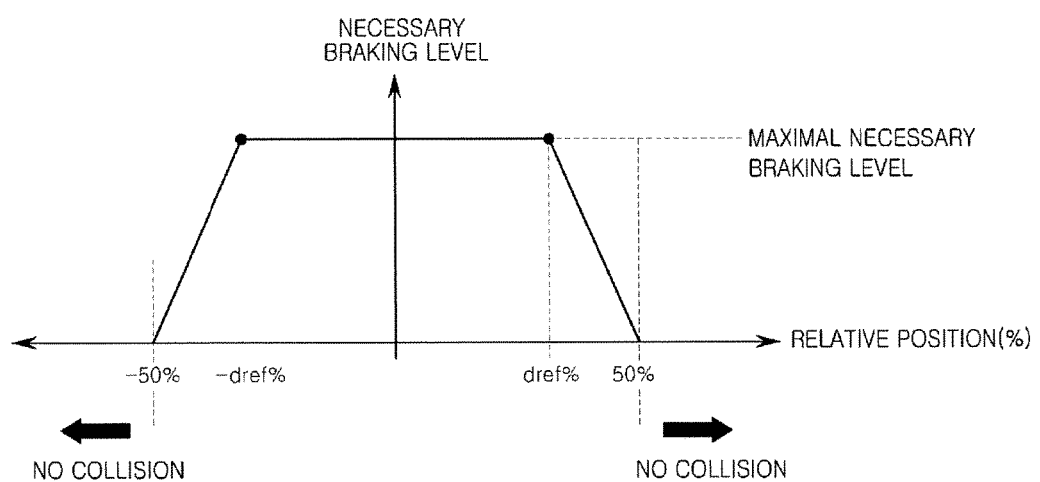
FIG. 6 is a graph illustrating control of a necessary braking level of autonomous emergency braking differentiated depending on a relative pedestrian position in the autonomous emergency braking system in accordance with one embodiment of the present invention.

FIG. 6 is a graph illustrating control of a necessary braking level of autonomous emergency braking differentiated depending on a relative pedestrian position in the autonomous emergency braking system in accordance with one embodiment of the present invention.

Referring to FIG. 6, when a current pedestrian position is in the braking area, a relative position of a pedestrian to the vehicle is predicted at a point in time after a TTC passes. When as a result the relative pedestrian position is within the preset distance dref based on the width of the vehicle in the lateral direction of the vehicle, a maximal necessary braking level is generated to perform emergency braking on the vehicle.

However, when the predicted relative position of the pedestrian is outside of the preset distance dref but is within 50% of the preset distance dref, a necessary braking level may be controlled to be linearly reduced by 50% of the preset distance dref. This is to not perform excessive braking when steering-avoidance or pedestrian-avoidance is easy due to a low risk of collision. That is, although the pedestrian is in the braking area, the necessary braking level is differentiated depending on the relative position of the pedestrian compared with the vehicle at the point in time after the TTC passes, thereby preventing the driver from an inconvenience caused by braking more than necessary.

As described above, the autonomous emergency braking system in accordance with one embodiment of the present invention predicts relative positions of a pedestrian and a vehicle at a point in time after a TTC passes according to a lateral movement of the pedestrian. Although a current position of the pedestrian is in a warning area or a braking area, based on the predicted relative positions of the pedestrian and vehicle, when a future position of the pedestrian is far from a future position of the vehicle and thus a collision will not occur therebetween, autonomous emergency braking is controlled to be postponed, thereby preventing an unnecessary warning and braking control. Also, a necessary braking level is differentiated depending on the predicted relative positions of the pedestrian and vehicle, thereby preventing a driver from being inconvenienced due to excessive braking.

Figure 7:
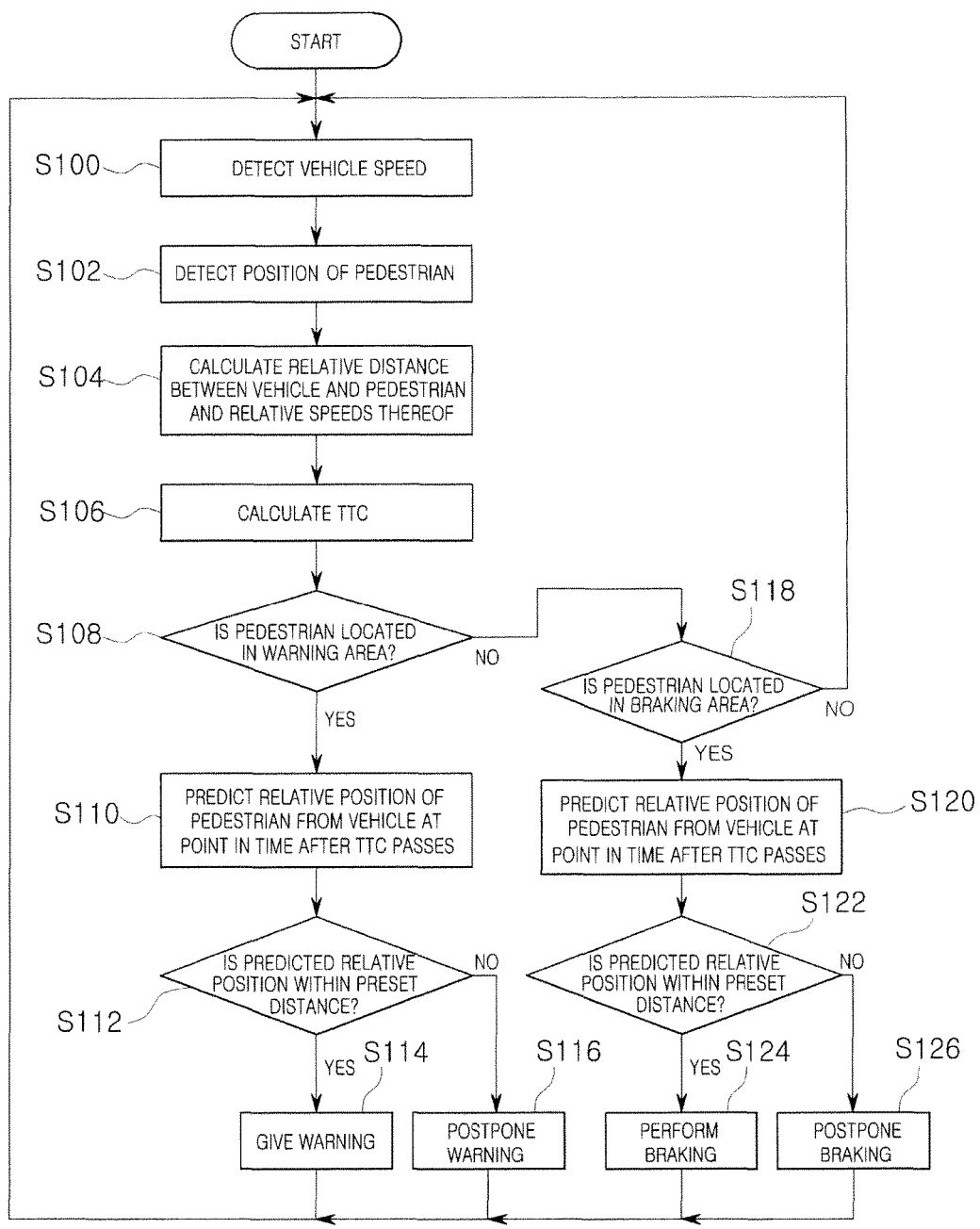
FIG. 7 is a control flowchart illustrating a method of controlling an autonomous emergency braking system in accordance with one embodiment of the present invention.

FIG. 7 is a control flowchart illustrating a method of controlling an autonomous emergency braking system in accordance with one embodiment of the present invention.

Referring to FIG. 7, first, the electronic control unit 10 detects a vehicle speed through the vehicle speed detector 12 in operation mode S100 (S100) and detects a position of a pedestrian through the pedestrian position detector 11 in operation mode S102 (S102). The detected position information of the pedestrian is stored in the pedestrian information storage portion 15.

In operation mode S104, the electronic control unit 10 calculates a relative distance between the vehicle and the pedestrian and relative speeds thereof according to the detected vehicle speed information and time series position change information of the pedestrian (S104).

In operation mode S106, the electronic control unit 10 calculates a TTC which is a time until the vehicle collides with the pedestrian (S106).

In operation mode S108, the electronic control unit 10 determines whether a current position of the pedestrian is located in a warning area and determines whether the pedestrian is located in the warning area (S108).

When as a result of the determination in operation mode S108 the pedestrian is currently located in the warning area, the electronic control unit 10 predicts a relative position of the pedestrian compared with the vehicle at a point in time after the TTC passes in operation mode S110 (S110).

In operation mode S112, the electronic control unit 10 determines whether the predicted relative position of the pedestrian is within a preset distance (S112). Here, the electronic control unit 10 determines whether the predicted relative position of the pedestrian is within the preset distance based on a width of the vehicle in a lateral direction of the vehicle. That is, whether a distance from the vehicle spaced in the lateral direction at a point in time of collision is within the preset distance is determined.

When as a result of the determination in operation mode S112 the predicted relative position of the pedestrian is within the preset distance, the electronic control unit 10 warns of a risk of collision between the vehicle and the pedestrian through the warning output portion 13 in operation mode S114 (S114).

However, when as the result of the determination in operation mode S112 the predicted relative position of the pedestrian is outside of the preset distance, the electronic control unit 10 determines that the risk of collision is low and postpones giving the warning in operation mode S116 (S116).

Meanwhile, when as the result of the determination in operation mode S108 the pedestrian is not currently located in the warning area, the electronic control unit 10 determines whether the pedestrian is located in a braking area (S118).

When as the result of operation mode S118, the pedestrian is not currently located in the braking area, the electronic control unit 10 returns to operation mode S100 and the preceding operation modes are performed.

When as a result of the determination in operation mode S118 the pedestrian is currently located in the braking area, the electronic control unit 10 estimates a relative position of the pedestrian compared with the vehicle at the point in time after the TTC passes in operation mode S120 (S120).

In operation mode S122, the electronic control unit 10 determines whether the predicted relative position of the pedestrian is within the preset distance (S122). Here, the electronic control unit 10 determines whether the predicted relative position of the pedestrian is within the preset distance based on the width of the vehicle in the lateral direction of the vehicle. That is, whether a distance from the vehicle spaced in the lateral direction at the point in time of collision is within the preset distance is determined.

When as a result of the determination in operation mode S122 the predicted relative position of the pedestrian is within the preset distance, the electronic control unit 10 generates a necessary braking level for braking the vehicle through the braking level generator 14 and performs a braking operation for autonomous emergency braking in operation mode S124 (S124).

However, when as the result of the determination in operation mode S122 the predicted relative position of the pedestrian is outside of the preset distance, the electronic control unit 10 determines that the risk of collision is low and postpones giving the warning in operation mode S126 (S126). Here, the electronic control unit 10 may generate the necessary braking level differently depending on the predicted relative position of the pedestrian. For example, as the predicted relative position of the pedestrian is farther than the preset distance, the generated necessary braking level may be gradually reduced.

As is apparent from the above description, in accordance with one embodiment of the present invention, relative positions of a pedestrian and a vehicle according to a lateral movement of the pedestrian are predicted and a warning is given and emergency braking is performed according to the predicted relative positions, thereby preventing an unnecessary or excessive warning and braking in a case where the pedestrian will not collide with the vehicle even when the pedestrian is located in a warning area or braking area.

Also, in accordance with one embodiment of the present invention, a necessary braking level is differentiated depending on relative positions of a pedestrian and a vehicle according to a lateral movement of the pedestrian, thereby preventing a driver from an inconvenience caused by braking more than necessary.

Although a few embodiments of the present invention have been shown and described, it should be appreciated by those skilled in the art that changes may be made in these embodiments without departing from the principles and spirit of the invention, the scope of which is defined in the claims and their equivalents.

What is claimed is:

1. An autonomous emergency braking system which performs autonomous emergency braking control including at least one of warning of a risk of collision and emergency braking, comprising:
    a vehicle speed detector which detects a vehicle speed of a vehicle;
    a pedestrian position detector which detects a position of a pedestrian;
    a pedestrian information storage portion which stores the position of the pedestrian detected by the pedestrian position detector in time series; and
    an electronic control unit which receives the vehicle speed detected by the vehicle speed detector and information of the position of the pedestrian detected by the pedestrian position detector, calculates a time to collision (TTC) according to a relative distance between the vehicle and the pedestrian and the vehicle speed, predicts a relative position of the pedestrian compared with the vehicle at a point in time after the calculated TTC passes by tracking a moving trajectory of the pedestrian from a time series change in the position of the pedestrian stored in the pedestrian information storage portion, and performs the autonomous emergency braking control depending on the predicted relative position of the pedestrian,
    wherein the electronic control unit estimates a future position of the pedestrian and a future position of the vehicle at the point in time the calculated TTC passes, respectively, compares the estimated future position of the pedestrian and the estimated future position of the vehicle, and predicts a lateral distance of the pedestrian from the vehicle according to a lateral separation between the estimated future position of the pedestrian and the estimated future position of the vehicle, and
    wherein the electronic control unit performs the emergency braking when the detected position of the pedestrian is in a braking area and the predicted lateral distance of the pedestrian is closer than a preset distance which is a distance away from an edge of the vehicle in a lateral direction, and postpones the emergency braking when the predicted lateral distance of the pedestrian is farther than the preset distance.

2. The autonomous emergency braking system of claim 1, wherein the electronic control unit gives the warning when the detected position of the pedestrian is in a warning area and the predicted lateral distance of the pedestrian is closer than the preset distance, and postpones the warning when the predicted lateral distance of the pedestrian is farther than the preset distance.

3. The autonomous emergency braking system of claim 1, comprising a braking level generator which generates a braking level for braking the vehicle,
    wherein the electronic control unit causes the braking level generator to generate a necessary braking level differently depending on the predicted lateral distance of the pedestrian when the detected position of the pedestrian is in the braking area.

4. The autonomous emergency braking system of claim 3, wherein the electronic control unit gradually reduces the necessary braking level generated by the braking level generator as the predicted lateral distance of the pedestrian becomes farther from the preset distance.

5. A method of controlling an autonomous emergency braking system which performs autonomous emergency braking control including at least one of warning of a risk of collision and emergency braking, the method comprising:
    detecting a position of a pedestrian;
    calculating a time to collision (TTC) according to a relative distance between a vehicle and the pedestrian and a vehicle speed;
    predicting a relative position of the pedestrian compared with the vehicle at a point in time after the calculated TTC passes by tracking a moving trajectory of the pedestrian from a time series change in the position of the pedestrian; and
    performing or postponing the autonomous emergency braking control depending on the predicted relative position of the pedestrian,
    wherein when the detected position of the pedestrian is in a warning area or a braking area and the predicted relative position of the pedestrian is within a preset distance which is a distance away from an edge of the vehicle in a lateral direction of the vehicle, a corresponding autonomous emergency braking control for the warning area or the braking area is performed, and when otherwise, the corresponding autonomous emergency braking control is postponed.

6. The method of claim 5, wherein when the detected position of the pedestrian is in the braking area and the predicted relative position of the pedestrian is within the preset distance from the vehicle in the lateral direction of the vehicle, the emergency braking is performed, and when otherwise, the emergency braking is postponed, and wherein while the emergency braking is performed, a necessary braking level generated to brake the vehicle is gradually reduced as the predicted relative position of the pedestrian becomes farther from the vehicle.

7. An autonomous emergency braking system which performs autonomous emergency braking control including at least one of warning of a risk of collision and emergency braking, comprising:

a vehicle speed detector which detects a vehicle speed of a vehicle;

a pedestrian position detector which detects a position of a pedestrian;

a pedestrian information storage portion which stores the position of the pedestrian detected by the pedestrian position detector in time series; and an electronic control unit which receives the vehicle speed detected by the vehicle speed detector and information of the position of the pedestrian detected by the pedestrian position detector, calculates a time to collision (TTC) according to a relative distance between the vehicle and the pedestrian and the vehicle speed, predicts a relative position of the pedestrian compared with the vehicle at a point in time after the calculated TTC passes by tracking a moving trajectory of the pedestrian from a time series change in the position of the pedestrian stored in the pedestrian information storage portion, and performs the autonomous emergency braking control depending on the predicted relative position of the pedestrian, wherein the electronic control unit estimates a future position of the pedestrian and a future position of the vehicle at the point in time the calculated TTC passes, respectively, compares the estimated future position of the pedestrian and the estimated future position of the vehicle, and predicts a lateral distance of the pedestrian from the vehicle according to a lateral separation between the estimated future position of the pedestrian and the estimated future position of the vehicle, and wherein the electronic control unit gives the warning when the detected position of the pedestrian is in a warning area and the predicted lateral distance of the pedestrian is closer than a preset distance which is a distance away from an edge of the vehicle in a lateral direction, and postpones the warning when the predicted lateral distance of the pedestrian is farther than the preset distance.

* * * * *